US010569423B1

(12) United States Patent
Jones et al.

(10) Patent No.: US 10,569,423 B1
(45) Date of Patent: Feb. 25, 2020

(54) SPIRAL CURVE SELF-ALIGNING DOCKING DEVICE

(71) Applicant: The United States of America as represented by the Secretary of the Navy, San Diego, CA (US)

(72) Inventors: Anthony D. Jones, San Diego, CA (US); Gregory W. Anderson, San Diego, CA (US); Wayne P. Liu, Honolulu, HI (US); Maxwell M. Kerber, San Diego, CA (US); Michael R. Murphy, San Diego, CA (US)

(73) Assignee: United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 16/202,383

(22) Filed: Nov. 28, 2018

(51) Int. Cl.
*B63G 8/41* (2006.01)
*B25J 15/00* (2006.01)
*B25J 9/00* (2006.01)
*B63G 8/00* (2006.01)

(52) U.S. Cl.
CPC ......... *B25J 15/0033* (2013.01); *B25J 9/0009* (2013.01); *B63G 8/001* (2013.01); *B63G 2008/008* (2013.01)

(58) Field of Classification Search
CPC .............. B63G 8/001; B63G 2008/001; B63G 2008/008; B63B 21/50; B63B 2021/50; B25J 9/0009; B25J 15/0033

USPC ......... 114/230.1, 230.15, 293, 312, 313, 322
See application file for complete search history.

(56) References Cited

U.S. PATENT DOCUMENTS

| 4,620,819 A * | 11/1986 | Marsland ................ E21B 41/04 |
| | | 114/312 |
| 4,721,055 A * | 1/1988 | Pado ....................... B63C 11/52 |
| | | 114/330 |
| 5,039,254 A * | 8/1991 | Piercy ........................ B25J 5/00 |
| | | 114/312 |
| 10,046,463 B1 | 8/2018 | Jones |
| 10,279,878 B2 * | 5/2019 | Sakaue .................. B63G 8/001 |
| 10,384,752 B2 * | 8/2019 | Reid ...................... B63G 8/001 |

\* cited by examiner

*Primary Examiner* — Daniel V Venne
(74) *Attorney, Agent, or Firm* — Naval Information Warfare Center, Pacific; Kyle Eppele; James R. McGee (57) ABSTRACT

A target spar. A left jaw member. The left guidance portion has a left spiral curve. The left arm portion has a left arm profile, a left arm gear, and a left arm protrusion. A right jaw member. The right guidance portion has a right spiral curve. The right arm portion comprises a right arm gear and a right arm protrusion. A top plate member. A bottom plate member. A drive unit comprising an electric motor within a pressure housing. A drive shaft on the electric motor. The bottom plate member abuts the left jaw member, the right jaw member, and the top plate member. The left jaw member and the right jaw member opened and closed. At the closed position, the target spar is slidably received in the left and right jaw members, the top and bottom plate members, and abuts the left and right arm profiles.

20 Claims, 6 Drawing Sheets

SPIRAL CURVE SELF-ALIGNING DOCKING DEVICE

FEDERALLY SPONSORED RESEARCH AND DEVELOPMENT

The Spiral Curve Self-Aligning Docking Device is assigned to the United States Government and is available for licensing and commercial purposes. Licensing and technical inquiries may be directed to the Office of Research and Technical Applications, Space and Naval Warfare Systems Center Pacific (Code 72120), San Diego, Calif., 92152 via telephone at (619) 553-2778 or email at ssc_pac_t2@navy.mil. Reference Navy Case 109184.

BACKGROUND OF THE INVENTION

1. Field of the Invention

The present invention relates to clamping mechanisms generally, and mechanical docking mechanisms for underwater vehicles specifically.

2. Description of the Related Art

Precise autonomous docking or operator guided docking of underwater vehicles to underwater platforms (such as unmanned vehicles, buoys, sensors, underwater struts, or pier foundations) is challenging because environmental factors and propulsion or steerage dynamics often impede the ability to maintain the precise alignment required to successfully dock. Existing methods employ variations of a funnel to guide and capture either the entire docking vehicle or a probe on the vehicle, reducing the level of precision needed to dock the underwater vehicle. However, using a funnel as a target imposes a burden on the docking target in that the target must then carry a component larger than the probe or the underwater vehicle docking with it. This drastically increases the size of the target platform.

Other existing systems use a cable, line, or post that is suspended or protruding from the docking target using conventional clamps or catchments. While this system reduces the dimension of the docking platform, it does not provide precise alignment of the underwater vehicle with the docking platform.

SUMMARY OF THE INVENTION

The present invention is a system for docking underwater vehicles. The system includes a target spar with a target spar profile, and a left jaw member and a right jaw member. The left jaw member comprises a left guidance portion and a left arm portion. The left guidance portion has a left spiral curve, a first left slot formed therethrough, a second left slot formed therethrough, and a third left slot formed therethrough. The left arm portion has a left arm profile, a left arm gear, a left arm hole formed therethrough, and a left arm protrusion. The right jaw member comprises a right guidance portion and a right arm portion. The right arm portion has a right spiral curve, a first right slot formed therethrough, a second right slot formed therethrough, and a third right slot formed therethrough. The right arm portion has a right arm profile, a right arm gear, a right arm hole formed therethrough, and a right arm protrusion. The system also includes a top plate member, wherein the top plate member has a top first hole, a top second hole, a top third hole, a top fourth hole, a top fifth hole, a top sixth hole, a top seventh hole, a top eighth hole, and a top ninth hole formed therethrough. A first gear with a first gear hole formed therethrough, a second gear with a second gear hole formed therethrough, a third gear with a third gear hole formed therethrough, and a fourth gear with a fourth gear hole formed therethrough are rotatably supported on the bottom plate member. The bottom plate member comprises a first cylindrical protrusion with a first bottom hole formed therethrough, a second cylindrical protrusion with a second bottom hole formed therethrough, and a third cylindrical protrusion with a third bottom hole formed therethrough.

The system additionally comprises a drive unit. The drive unit comprises an electric motor within a pressure housing. A drive shaft is rotatably supported on the drive motor, and the drive shaft is received in the first gear hole. The first gear engages with the second gear, the second gear engages with the third gear, the third gear engages with the fourth gear and the left gear arm, and the fourth gear also engages with the right gear arm. The bottom plate member abuts the first gear, the second gear, the third gear, the fourth gear, the left arm protrusion, and the right arm gear. The top plate member abuts the first cylindrical protrusion, the second cylindrical protrusion, the third cylindrical protrusion, the first gear, the second gear, the third gear, the fourth gear, the left arm gear, and the right arm protrusion. The top first hole is coaxially aligned with the first gear hole, the top second hole is coaxially aligned with the second gear hole, the top third hole is coaxially aligned with the third gear hole, the top fourth hole is coaxially aligned with the fourth gear hole, the top fifth hole is coaxially aligned with the right arm hole, the top sixth hole is coaxially aligned with the left arm hole, the top seventh hole is coaxially aligned with the first bottom hole, the top eighth hole is coaxially aligned with the third bottom hole, and the top ninth hole is coaxially aligned with the second bottom hole. The left jaw member and the right jaw member are moved between an open position and a closed position. At the closed position, the target spar is slidably received in the left jaw member, the right jaw member, the top plate member, and the bottom plate member, and the target spar profile abuts the left arm profile and the right arm profile.

BRIEF DESCRIPTION OF THE DRAWINGS

Throughout the several views, like elements are referenced using like elements. The elements in the figures are not drawn to scale, and some dimensions may be exaggerated for clarity.

DETAILED DESCRIPTION OF THE INVENTION

While this invention may be embodied in different forms, the drawings and this section describe in detail specific embodiments of the invention with the understanding that the present disclosure is to be considered merely a preferred embodiment of the invention, and is not intended to limit the invention in any way.

Figure 1:
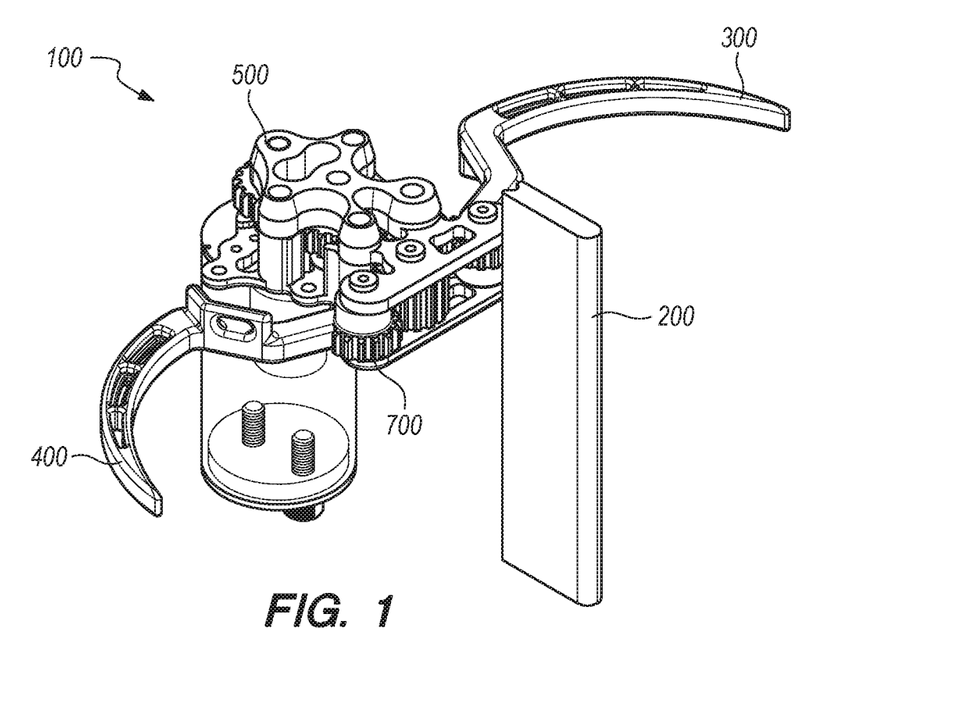
FIG. 1 is a front perspective view of an embodiment of the present invention.

FIG. 1 depicts an embodiment of the system for docking underwater vehicles 100. The system for docking underwater vehicles 100 comprises several major components. The first is a target spar 200. The target spar 200 is what the underwater vehicle docks with. The system for docking underwater vehicles 100 additionally includes a set of opposing jaws that mate with the target spar 200. These include a left jaw member 300 and a right jaw member 400. Additionally, the system for docking underwater vehicles 100 includes a top plate member 500 and a bottom plate member 700.

Figure 2:
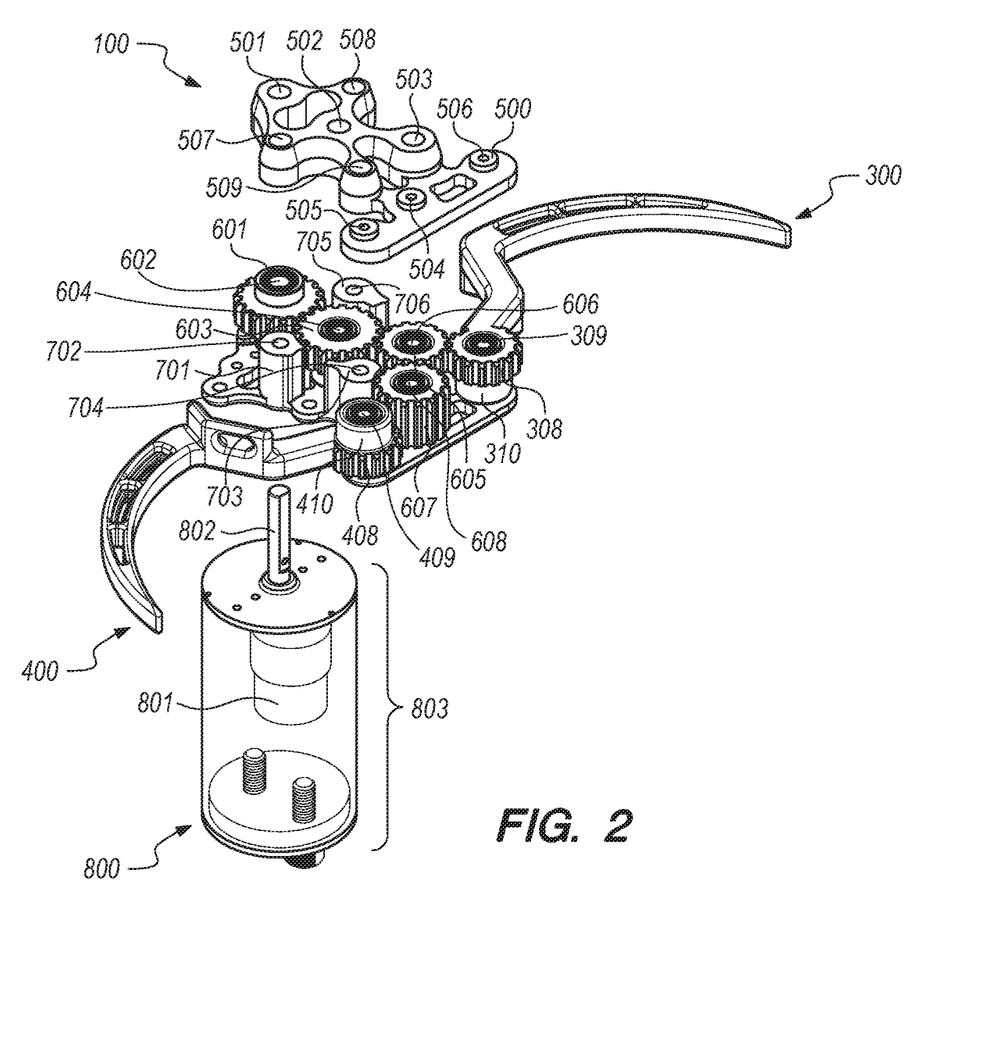
FIG. 2 is an exploded view of an embodiment of the present invention.

FIG. 2 depicts an exploded view of the system for docking underwater vehicles 100. As depicted in FIG. 2, the top plate member 500 has a top first hole 501, a top second hole 502, a top third hole 503, a top fourth hole 504, a top fifth hole 505, a top sixth hole 506, a top seventh hole 507, a top eighth hole 508, and a top ninth hole 509. The first gear 601, second gear 603, third gear 605, fourth gear 607, left jaw member 300, and right jaw member 400 abut the bottom plate member 700. The first gear 601 has a first gear hole 602 formed therethrough. The second gear 603 has a second gear hole 604 formed therethrough. The third gear 605 has a third gear hole 606 formed therethrough. The fourth gear 607 has a fourth gear hole 608. The left jaw member 300 has a left arm gear 308 above a left arm protrusion 310. The left arm gear 308 and left arm protrusion 310 have a left arm hole 309 formed therethrough. The right jaw member 400 has a right arm protrusion 410 above a right arm gear 408. The right arm protrusion 410 and right arm gear 408 have a right arm hole 409 formed therethrough.

FIG. 2 also depicts a drive unit 800. The drive unit comprises an electric motor 801, which may be a DC motor. The electric motor 801 is protected from the underwater environment by a pressure housing 803. The electric motor 801 drives the left jaw member 300 and the right jaw member 400. The electric motor 801 is connected to the first gear 601 by a drive shaft 802, which is received through the first gear hole 602. The first gear 601 drives the second gear 603. The second gear drives the third gear 605. The third gear 605 drives the left jaw member 300 by driving the left arm gear 308. The third gear 605 also drives the fourth gear 607. The fourth gear 607 drives the right jaw member 400 by driving the right arm gear 408. The bottom plate member 700 also comprises a first cylindrical protrusion 701 with a first bottom hole 702 formed therethrough, a second cylindrical protrusion 703 with a second bottom hole 704 formed therethrough, and a third cylindrical protrusion 705 with a third bottom hole 706 formed therethrough.

The first gear 601 is secured to the top plate member 500 using a shaft, bushings, and bearings, with the shaft running through the first gear hole 602 and the top first hole 501. The second gear 603 is secured to the top plate member 500 using a shaft, bushings, and bearings, with the shaft running through the second gear hole 604 and the top second hole 502. The third gear 605 is secured to the top plate member 500 using a shaft, bushings, and bearings, with the shaft running through the third gear hole 606 and the top third hole 503. The fourth gear 604 is secured to the top plate member 500 using a shaft, bushings, and bearings, with the shaft running through the fourth gear hole 605 and the top fourth hole 504. The left jaw member 300 is secured to the top plate member 500 using a shaft, bushings, and bearings, with the shaft running through the left arm hole 309 and the top sixth hole 506. The right jaw member 400 is secured to the top plate member 500 using a shaft, bushings, and bearings, with the shaft running through the right arm hole 409 and the top fifth hole 505. The top plate member 500 is additionally secured to the bottom plate member 700 with fasteners securing the top seven hole 507 to the first bottom hole 702, the top eighth hole 508 to the third bottom hole 706, and the top ninth hole 509 to the second bottom hole 704.

Figure 3:
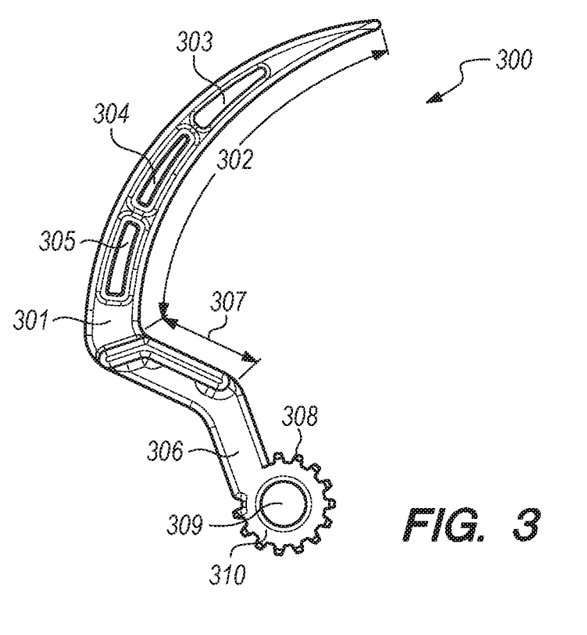
FIG. 3 is a top view of a left jaw member according to one embodiment of the present invention.

FIG. 3 depicts the left jaw member 300 in detail. The left jaw member 300 further comprises a curved left guidance portion 301, which is connected to the left arm gear 308 by a left arm portion 306. The interior surface of the left guidance portion 301 is defined by a left spiral curve 302. This left spiral curve 302 is defined by equation 1 below:

$$r = k\theta, \quad (1)$$

where r is the length of the radius from the center of the curve, k is a chosen constant, and $\theta$ is the corresponding angular position of the radius r. Equation 1 is a polar equation with $\theta$ measured in radians. The interior surface of the left arm portion 306 is defined by a left arm profile 307. Additionally, the left guidance portion 301 has a first left slot 303, a second left slot 304, and a third left slot 305 formed therethrough. These slots can serve to reduce material requirements during additive manufacturing and reduce overall weight.

Figure 4:
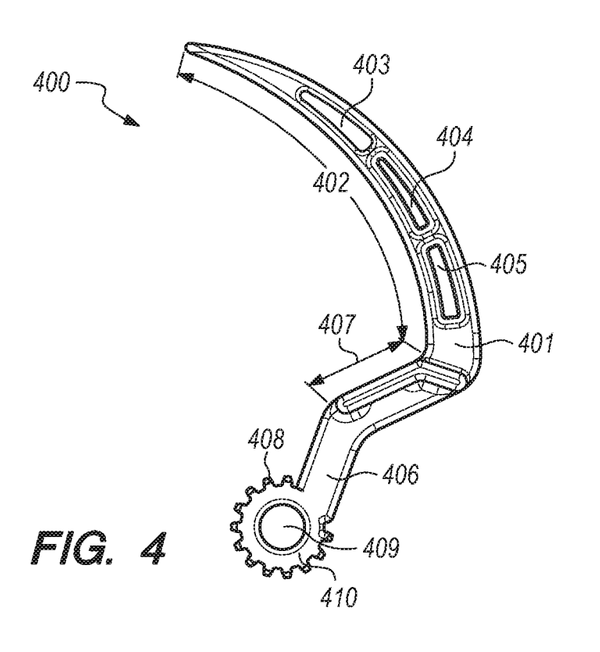
FIG. 4 is a top view of a right jaw member according to one embodiment of the present invention.

FIG. 4 depicts the right jaw member 400 in detail. The right jaw member 400 further comprises a curved right guidance portion 401, which is connected to the right arm gear 408 by a right arm portion 406. The interior surface of the right guidance portion 401 is defined by a right spiral curve 402. This right spiral curve 402 is defined by equation 1 above. The interior surface of the right arm portion 406 is defined by a right arm profile 407. Additionally, the right guidance portion 401 has a first right slot 403, a second right slot 404, and a third right slot 405 formed therethrough. These slots can serve to reduce material requirements during additive manufacturing and reduce overall weight.

Figure 5A:
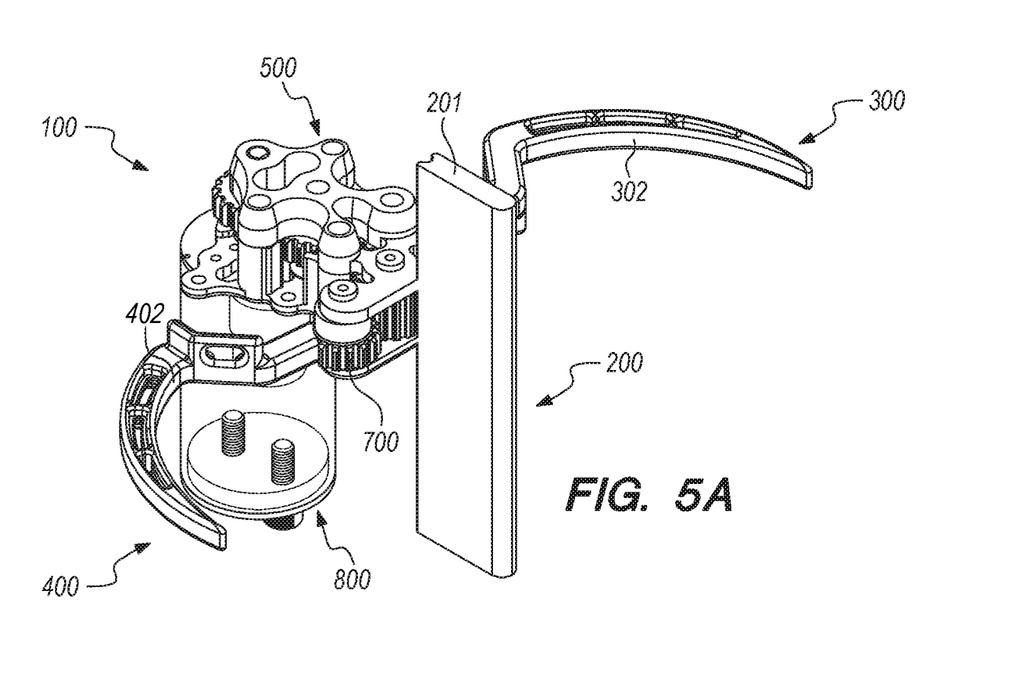
FIG. 5A is a front perspective view of an embodiment of the present invention.
Figure 5B:
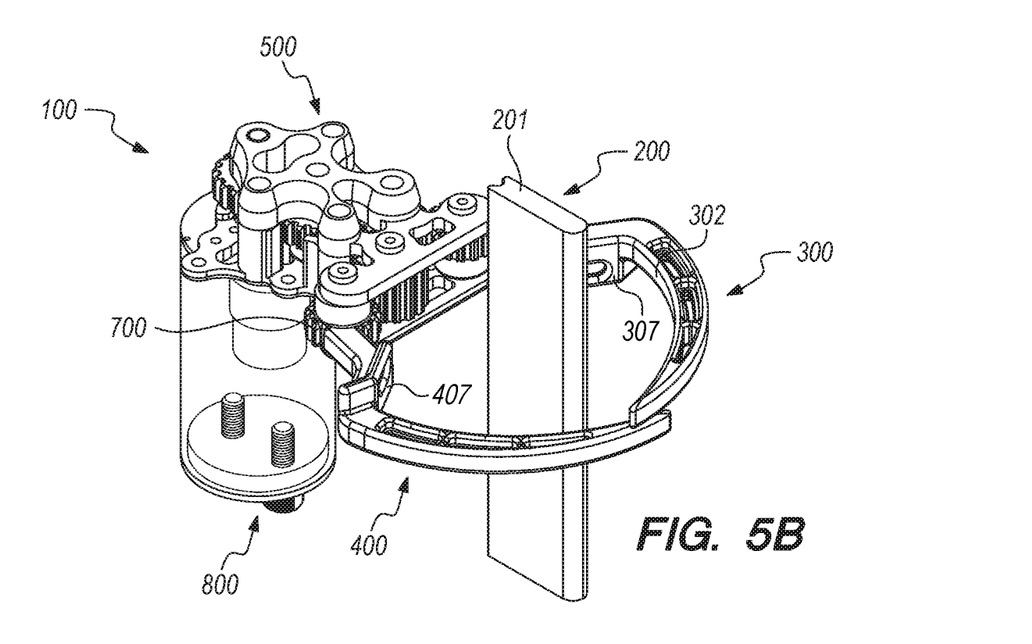
FIG. 5B is a front perspective view of an embodiment of the present invention.
Figure 5C:
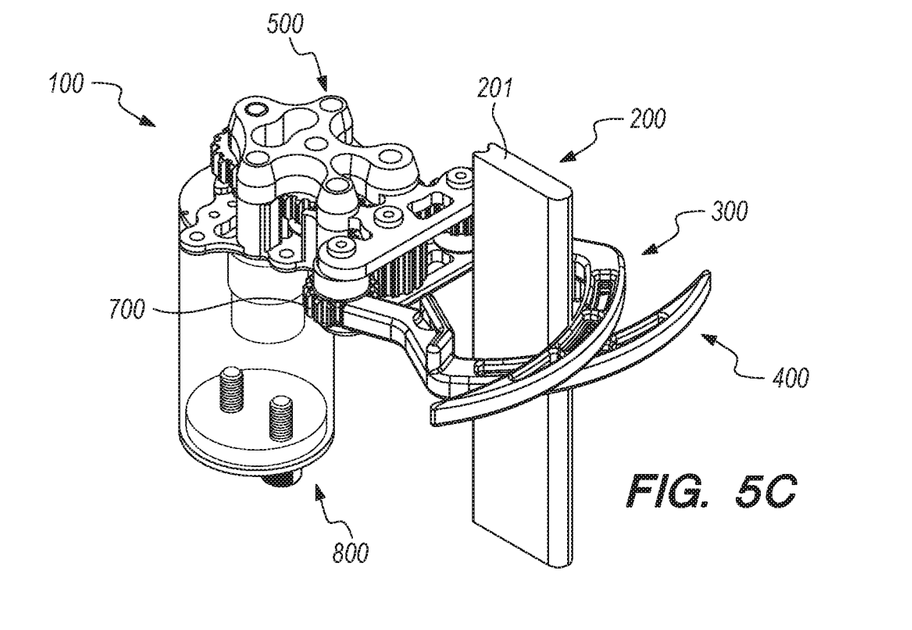
FIG. 5C is a front perspective view of an embodiment of the present invention.

FIG. 5A, FIG. 5B, FIG. 5C, and FIG. 5D show stages where the left jaw member 300, right jaw member 400, top plate member 500, and bottom plate member 700 engage and secure to the target spar 200. The left spiral curve 302 and right spiral curve 402 are the portions that make initial contact with the target spar 200. The values of k, $\theta$, and the separation distance between portions of the left jaw member 300 and right jaw member 400 define the aperture presented by the docking mechanism. The aperture chosen should be greater than the positional accuracy of the underwater vehicle's docking control system. FIG. 5A depicts the wide open aperture on approach to the target spar 200. FIG. 5B and FIG. 5C depict the left jaw member 300 and right jaw member 400 closing. As the jaws close, the left spiral curve 302 or the right spiral curve 402 (depending on which portion makes contact with the target spar 200) will move the target spar 200 (or the docking vehicle relative to the target spar 200) in a manner such that the target spar 200 approaches the center and base of the jaws. Since equation 1 is a spiral curve, the contact angle between the left spiral curve 302 or right spiral curve 402 can be determined or can be a design parameter which is optimized to ensure that the torque applied to the jaws is effectively converted to a translational force applied to the target spar 200. Near the base of the left jaw member 300 and right jaw member 400, the profile transitions to one matching the target spar profile 201 (these profiles are the left arm profile 307 and the right arm profile 407). The point of transition and the configuration of the target spar profile 201 (and corresponding left arm profile 307 and right arm profile 407) are chosen to tolerate a degree of initial misalignment greater than that inherent in the underwater vehicle's docking control system.

Figure 5D:
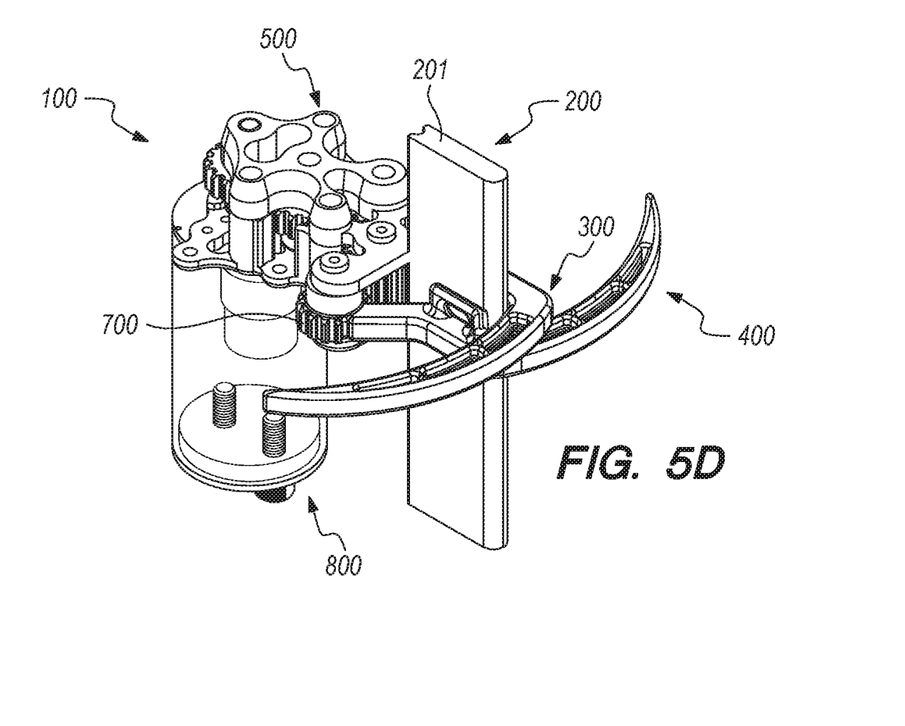
FIG. 5D is a front perspective view of an embodiment of the present invention.

FIG. 5D depicts the jaws fully closed, securing the device to the target spar 200. As the jaws are fully closed, the left arm profile 307 is in contact with the left side of the target spar profile 201, and the right arm profile 407 is in contact with the right side of the target spar profile 201. This contact prevents yaw and sway. Additionally, depending on the design configuration, the front and rear edges of the target spar profile 201 are in contact with the left spiral curve 302 and the right spiral curve 402, as well as the top plate member 500 or bottom plate member 700, preventing surge. The jaws are designed such that the contact areas of the opposite jaws directly oppose one another, preventing roll (in one embodiment, the left arm profile 307 and right arm profile 407 directly oppose one another). With adequate closure force, the friction of the contact will also allow the vehicle to resist heave and pitch.

Figure 6A:
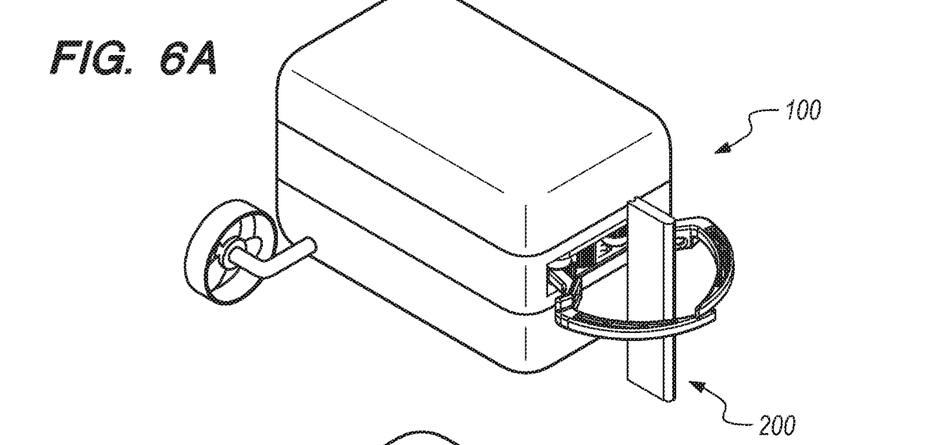
FIG. 6A is a front perspective view of an embodiment showing alignment correction with a target spar.
Figure 6B:
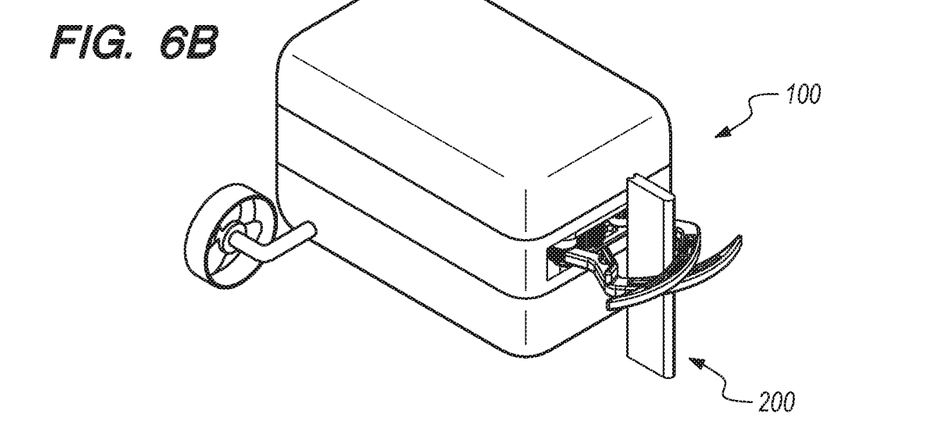
FIG. 6B is a front perspective view of an embodiment showing alignment correction with a target spar.
Figure 6C:
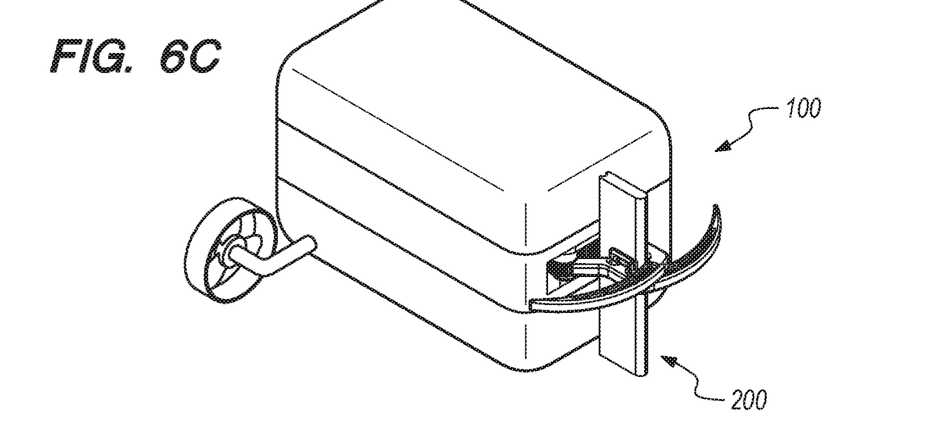
FIG. 6C is a front perspective view of an embodiment showing alignment correction with a target spar.

The closure of the jaws will force the target spar 200 into a fully constrained position despite any initial misalignment or offsets. FIG. 6A, FIG. 6B, and FIG. 6C depict this in action. As the jaws initially close in FIG. 6A, the underwater vehicle is misaligned in all three axes. As the jaws close in FIG. 6B and FIG. 6C, the vehicle is forced into correct alignment with the target spar 200 (alternatively, the target spar 200 is forced into alignment with the underwater vehicle).

In one embodiment, the left jaw member 300 and right jaw member 400 can be duplicates of the same component mounted in a mirrored configuration. This reduces the unique part count and ensure even, parallel pressure when mated to the target spar 200.

The present invention uses the combination of a designed spiral curve (the left spiral curve 302 and right spiral curve 402) which transitions into a mating profile (the left arm profile 307 and right arm profile 407, corresponding to the target spar profile 201) to promote positive control of closure forces and ensure the correct final alignment, despite initial errors in alignment and position. The present invention does not require a target that is large in comparison to the mechanism or underwater vehicle (as prior art funnel systems do). When the jaws are closed, the system is mechanically secure, constraining both the position and orientation of the docked vehicle. The system for docking underwater vehicles 100 is universally applicable to any underwater platform which can extend or project some surface for use as a target spar 200.

From the above description of the present invention, it is manifest that various techniques may be used for implementing its concepts without departing from the scope of the claims. The described embodiments are to be considered in all respects as illustrative and not restrictive. The method disclosed herein may be practiced in the absence of any element that is not specifically claimed. It should also be understood that the present invention is not limited to the particular embodiments described herein, but is capable of being practiced in many embodiments without departure from the scope of the claims.

What is claimed is:

1. A system for docking comprising:
   a left jaw member comprising a left guidance portion and a left arm portion, wherein the left guidance portion has a left spiral curve, wherein the left arm portion has a left arm profile, wherein the left arm portion comprises a left arm engagement for rotating the left jaw member;
   a right jaw member comprising a right guidance portion and a right arm portion, wherein the right guidance portion has a right spiral curve, wherein the right arm portion has a right arm profile, wherein the right arm portion comprises a right arm engagement for rotating the right jaw member;
   a top plate member;
   a bottom plate member;
   a drive unit, wherein a drive shaft is rotatably supported on the drive unit;
   wherein the bottom plate member abuts the left jaw member, the right jaw member, and the top plate member; and
   wherein the left jaw member and the right jaw member are moved between an open position and a closed position, wherein at the closed position, a target spar is slidably received in the left jaw member, the right jaw member, the top plate member and the bottom plate member, wherein a target spar profile of the target spar abuts the left arm profile and the right arm profile.

2. The system of claim 1, further comprising a first gear rotatably supported on the bottom plate member, wherein the first gear has a first gear hole formed therethrough.

3. The system of claim 2, further comprising a second gear, a third gear, and a fourth gear, each rotatably supported on the bottom plate member.

4. The system of claim 3, wherein the bottom plate comprises a first cylindrical protrusion, a second cylindrical protrusion, and a third cylindrical protrusion.

5. The system of claim 4, wherein the drive shaft is received in the first gear hole, wherein the first gear engages with the second gear, wherein the second gear engages with the third gear, wherein the third gear engages with the fourth gear and a left arm gear of the left arm engagement, wherein the fourth gear engages with a right arm gear of the right arm engagement.

6. The system of claim 5, wherein the bottom plate member abuts the first gear, the second gear, the third gear, the fourth gear, a left arm protrusion of the left arm engagement, and the right arm gear.

7. The system of claim 6, wherein the top plate abuts the first cylindrical protrusion, the second cylindrical protrusion, the third cylindrical protrusion, the first gear, the second gear, the third gear, the fourth gear, the left arm gear, and a right arm protrusion of the right arm engagement.

8. A system for docking underwater vehicles comprising:
   a target spar having a target spar profile;
   a left jaw member comprising a left guidance portion and a left arm portion, wherein the left guidance portion has a left spiral curve, wherein the left arm portion has a left arm profile, wherein the left arm portion comprises a left arm gear, wherein the left arm portion comprises a left arm protrusion;
   a right jaw member comprising a right guidance portion and a right arm portion, wherein the right guidance portion has a right spiral curve, wherein the right arm portion has a right arm profile, wherein the right arm portion comprises a right arm gear, wherein the right arm portion comprises a right arm protrusion;

a top plate member;

a first gear rotatably supported on a bottom plate member, wherein the first gear has a first gear hole formed therethrough;

second gear rotatably supported on the bottom plate member;

a third gear rotatably supported on the bottom plate member;

a fourth gear rotatably supported on the bottom plate member;

wherein the bottom plate member comprises a first cylindrical protrusion, wherein the bottom plate comprises a second cylindrical protrusion, wherein the bottom plate comprises a third cylindrical protrusion;

a drive unit, wherein the drive unit comprises an electric motor within a pressure housing, wherein a drive shaft is rotatably supported on the electric motor;

wherein the drive shaft is received in the first gear hole, wherein the first gear engages with the second gear, wherein the second gear engages with the third gear, wherein the third gear engages with the fourth gear and the left arm gear, wherein the fourth gear engages with the right arm gear;

wherein the bottom plate member abuts the first gear, the second gear, the third gear, the fourth gear, the left arm protrusion, and the right arm gear;

wherein the top plate abuts the first cylindrical protrusion, the second cylindrical protrusion, the third cylindrical protrusion, the first gear, the second gear, the third gear, the fourth gear, the left arm gear, and the right arm protrusion;

wherein the left jaw member and the right jaw member are moved between an open position and a closed position, wherein at the closed position, the target spar is slidably received in the left jaw member, the right jaw member, the top plate member, and the bottom plate member, wherein the target spar profile abuts the left arm profile and the right arm profile.

9. The system of claim 8, wherein the left guidance portion has a first left slot formed therethrough, wherein the left guidance portion has a second left slot formed therethrough, and wherein the left guidance portion has a third left slot formed therethrough.

10. The system of claim 9, wherein the right guidance portion has a first right slot formed therethrough, wherein the right guidance portion has a second right slot formed therethrough, and wherein the right guidance portion has a third right slot formed therethrough.

11. The system of claim 8, wherein the left arm portion has a left arm hole formed therethrough, and wherein the right arm portion has a right arm hole formed therethrough.

12. The system of claim 11, wherein the top plate member has a top first hole formed therethrough, wherein the top plate member has a top second hole formed therethrough, wherein the top plate member has a top third hole formed therethrough, wherein the top plate member has a top fourth hole formed therethrough, wherein the top plate member has a top fifth hole formed therethrough, wherein the top plate member has a top sixth hole formed therethrough, wherein the top plate member has a top seventh hole formed therethrough, wherein the top plate member has a top eighth hole formed therethrough, and wherein the top plate member has a top ninth hole formed therethrough.

13. The system of claim 12, wherein the second gear has a second gear hole formed therethrough, wherein the third gear has a third gear hole formed therethrough, wherein the fourth gear has a fourth gear hole formed therethrough, wherein the first cylindrical protrusion has a first bottom hole formed therethrough, wherein the second cylindrical protrusion has a second bottom hole formed therethrough, and wherein the third cylindrical protrusion has a third bottom hole formed therethrough.

14. The system of claim 13, wherein the top first hole is coaxially aligned with the first gear hole, wherein the top second hole is coaxially aligned with the second gear hole, wherein the top third hole is coaxially aligned with the third gear hole, wherein the top fourth hole is coaxially aligned with the fourth gear hole, wherein the top fifth hole is coaxially aligned with the right arm hole, wherein the top sixth hole is coaxially aligned with the left arm hole, wherein the top seventh hole is coaxially aligned with the first bottom hole, wherein the top eighth hole is coaxially aligned with the third bottom hole, and wherein the top ninth hole is coaxially aligned with the second bottom hole.

15. A system for docking underwater vehicles comprising:

a target spar having a target spar profile;

a left jaw member comprising a left guidance portion and a left arm portion,
 wherein the left guidance portion has a left spiral curve,
 wherein the left guidance portion has a first left slot formed therethrough,
 wherein the left guidance portion has a second left slot formed therethrough,
 wherein the left guidance portion has a third left slot formed therethrough,
 wherein the left arm portion has a left arm profile,
 wherein the left arm portion comprises a left arm gear,
 wherein the left arm portion has a left arm hole formed therethrough,
 wherein the left arm portion comprises a left arm protrusion;

a right jaw member comprising a right guidance portion and a right arm portion,
 wherein the right guidance portion has a right spiral curve,
 wherein the right guidance portion has a first right slot formed therethrough,
 wherein the right guidance portion has a second right slot formed therethrough,
 wherein the right guidance portion has a third right slot formed therethrough,
 wherein the right arm portion has a right arm profile,
 wherein the right arm portion comprises a right arm gear,
 wherein the right arm portion has a right arm hole formed therethrough,
 wherein the right arm portion comprises a right arm protrusion;

a top plate member,
 wherein the top plate member has a top first hole formed therethrough,
 wherein the top plate member has a top second hole formed therethrough,
 wherein the top plate member has a top third hole formed therethrough, wherein the top plate member has a top fourth hole formed therethrough,
wherein the top plate member has a top fifth hole formed therethrough,
wherein the top plate member has a top sixth hole formed therethrough,
wherein the top plate member has a top seventh hole formed therethrough,
wherein the top plate member has a top eighth hole formed therethrough,
wherein the top plate member has a top ninth hole formed therethrough;
a first gear rotatably supported on a bottom plate member, wherein the first gear has a first gear hole formed therethrough;
a second gear rotatably supported on the bottom plate member, wherein the second gear has a second gear hole formed therethrough;
a third gear rotatably supported on the bottom plate member, wherein the third gear has a third gear hole formed therethrough;
a fourth gear rotatably supported on the bottom plate member, wherein the fourth gear has a fourth gear hole formed therethrough;
wherein the bottom plate member comprises a first cylindrical protrusion,
wherein the first cylindrical protrusion has a first bottom hole formed therethrough,
wherein the bottom plate comprises a second cylindrical protrusion,
wherein the second cylindrical protrusion has a second bottom hole formed therethrough,
wherein the bottom plate comprises a third cylindrical protrusion,
wherein the third cylindrical protrusion has a third bottom hole formed therethrough;
a drive unit, wherein the drive unit comprises an electric motor within a pressure housing, wherein a drive shaft is rotatably supported on the electric motor;
wherein the drive shaft is received in the first gear hole, wherein the first gear engages with the second gear, wherein the second gear engages with the third gear, wherein the third gear engages with the fourth gear and the left arm gear, wherein the fourth gear engages with the right arm gear;
wherein the bottom plate member abuts the first gear, the second gear, the third gear, the fourth gear, the left arm protrusion, and the right arm gear;
wherein the top plate member abuts the first cylindrical protrusion, the second cylindrical protrusion, the third cylindrical protrusion, the first gear, the second gear, the third gear, the fourth gear, the left arm gear, and the right arm protrusion;
wherein the top first hole is coaxially aligned with the first gear hole, wherein the top second hole is coaxially aligned with the second gear hole, wherein the top third hole is coaxially aligned with the third gear hole, wherein the top fourth hole is coaxially aligned with the fourth gear hole, wherein the top fifth hole is coaxially aligned with the right arm hole, wherein the top sixth hole is coaxially aligned with the left arm hole, wherein the top seventh hole is coaxially aligned with the first bottom hole, wherein the top eighth hole is coaxially aligned with the third bottom hole, wherein the top ninth hole is coaxially aligned with the second bottom hole; and
wherein the left jaw member and the right jaw member are moved between an open position and a closed position, wherein at the closed position, the target spar is slidably received in the left jaw member, the right jaw member, the top plate member, and the bottom plate member, wherein the target spar profile abuts the left arm profile and the right arm profile.

16. The system of claim 1, wherein the left jaw member and the right jaw member are each an instance of a same component mounted within the system in a mirrored configuration.

17. The system of claim 1, wherein each one of the left spiral curve and the right spiral curve is defined by an equation $r=k\theta$ where r is a length of a radius from a center of the one of the left spiral curve and the right spiral curve, k is a constant, and $\theta$ is an angular position.

18. The system of claim 1, wherein the drive unit is arranged so that an electric motor rotates the drive shaft, which rotates the left arm engagement and the right arm engagement to rotate the left jaw member and the right jaw member between the open position and the closed position.

19. A system for docking an underwater vehicle comprising:
the system of claim 1 included in the underwater vehicle; and
the target spar of a docking platform.

20. The system of claim 8, wherein the electric motor is arranged to rotate the drive shaft, which, via the first gear, the second gear, the third gear, and the fourth gear, rotates the left arm gear and the right arm gear to rotate the left jaw member and the right jaw member between the open position and the closed position.

* * * * *